(12) United States Patent
Bolton

(10) Patent No.: US 9,721,444 B2
(45) Date of Patent: Aug. 1, 2017

(54) THEFT ALARM SYSTEM

(71) Applicant: Cecil Bolton, East Spencer, NC (US)

(72) Inventor: Cecil Bolton, East Spencer, NC (US)

( * ) Notice: Subject to any disclaimer, the term of this patent is extended or adjusted under 35 U.S.C. 154(b) by 0 days.

(21) Appl. No.: 14/987,081

(22) Filed: Jan. 4, 2016

(65) Prior Publication Data
US 2017/0193770 A1    Jul. 6, 2017

(51) Int. Cl.
*G08B 13/14* (2006.01)
*G08B 13/08* (2006.01)
*G06F 21/88* (2013.01)

(52) U.S. Cl.
CPC .............. *G08B 13/08* (2013.01); *G06F 21/88* (2013.01); *G08B 13/14* (2013.01); *G08B 13/1427* (2013.01)

(58) Field of Classification Search
CPC .... G08B 13/08; G08B 13/14; G08B 13/1427; G08B 21/18; G08B 21/0288; G08B 13/1436; G08B 14/09; G08B 25/008; G08B 21/24; G06F 21/88; G06K 2017/0045; A45C 13/185; A45C 13/18
USPC ...... 340/571, 541, 574, 573.5, 693.5, 568.1, 340/568.7, 568.6, 539.21; 381/122, 267
See application file for complete search history.

(56) References Cited

U.S. PATENT DOCUMENTS

| 3,930,249 | A | 12/1975 | Steck et al. |
| D329,746 | S | 9/1992 | McGallaird |
| 5,939,981 | A | 8/1999 | Renney |
| 5,955,948 | A * | 9/1999 | Howell ............. G08B 21/0297 150/101 |
| 6,133,830 | A * | 10/2000 | D'Angelo .......... G08B 13/1409 340/539.1 |
| 6,870,483 | B1 | 3/2005 | Davis |
| 8,179,255 | B1 * | 5/2012 | Lamore ............. G08B 13/1436 340/539.13 |
| 8,707,460 | B2 | 4/2014 | Cabouli |
| 9,215,561 | B1 * | 12/2015 | Arman .................... H04W 4/22 |
| 2009/0320978 | A1 | 12/2009 | Martinez |
| 2011/0205057 | A1 * | 8/2011 | Sizemore ................ G01S 19/17 340/568.6 |

FOREIGN PATENT DOCUMENTS

WO    WO0126392    4/2001

* cited by examiner

*Primary Examiner* — Anh V La

(57) ABSTRACT

A theft alarm system includes a personal article that may be carried. The personal article has a closure that is positionable in an open position. An alarm unit is coupled to the personal article. The alarm unit is in communication with the closure such that the alarm detects when the closure is manipulated into the open position. A base unit is configured to be carried and the base unit is in communication with the alarm unit. The base unit selectively emits an audible alarm when the personal article has been opened. The base unit selectively actuates the alarm unit to emit an audible alarm thereby facilitating the personal article to be located. An electronic device is provided and the electronic device may be carried. The electronic device is in wireless communication with the alarm unit. The electronic device emits an audible alarm when the personal article is opened.

7 Claims, 4 Drawing Sheets

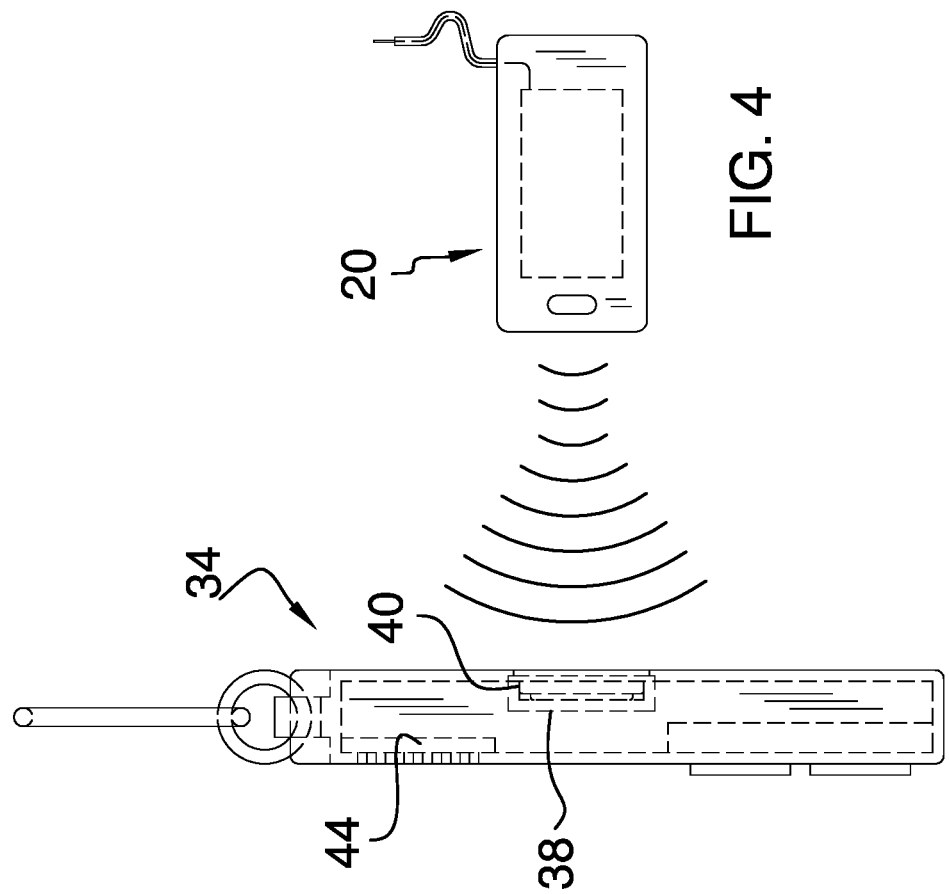
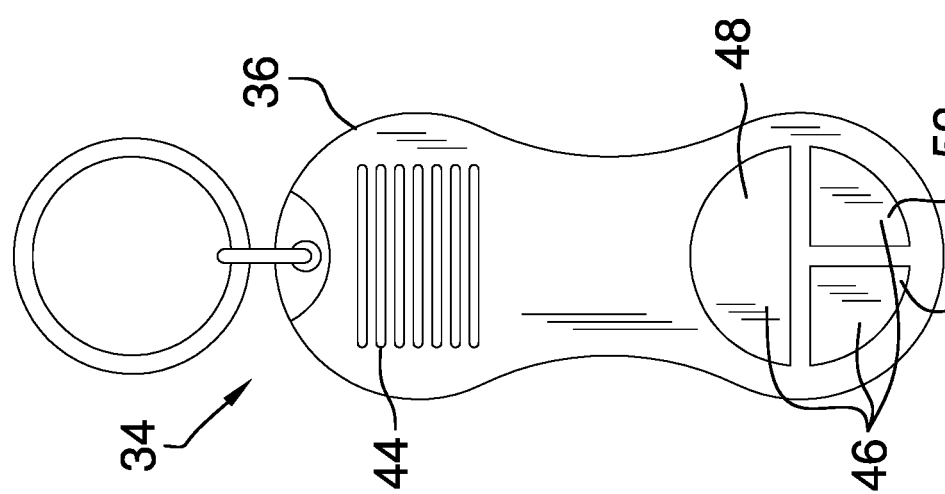

THEFT ALARM SYSTEM

BACKGROUND OF THE DISCLOSURE

Field Of The Disclosure

The disclosure relates to alarm devices and more particularly pertains to a new alarm device for inhibiting a personal article from being stolen.

SUMMARY OF THE DISCLOSURE

An embodiment of the disclosure meets the needs presented above by generally comprising a personal article that may be carried. The personal article has a closure that is positionable in an open position to access an interior of the personal article. An alarm unit is coupled to the personal article. The alarm unit is in communication with the closure such that the alarm detects when the closure is manipulated into the open position. A base unit is configured to be carried and the base unit is in communication with the alarm unit. The base unit selectively emits an audible alarm when the personal article has been opened. The base unit selectively actuates the alarm unit to emit an audible alarm thereby facilitating the personal article to be located. An electronic device is provided and the electronic device may be carried. The electronic device is in wireless communication with the alarm unit. The electronic device emits an audible alarm when the personal article is opened.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a front view of a base unit of an embodiment of the disclosure.

FIG. 3 is a left side phantom view of an embodiment of the disclosure.

FIG. 4 is a front phantom view of a remote unit of an embodiment of the disclosure.

DESCRIPTION OF THE PREFERRED EMBODIMENT

Figure 1:
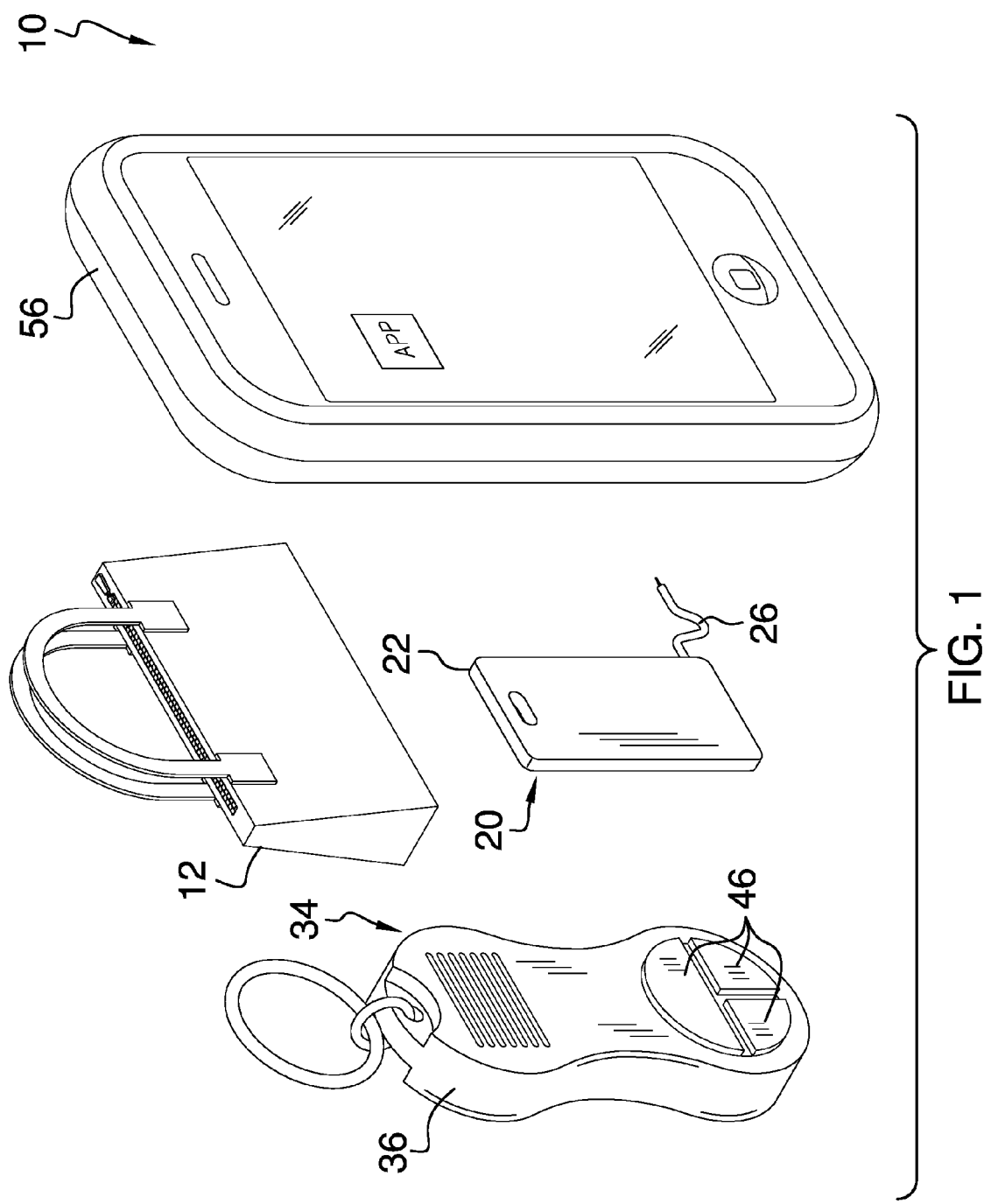
FIG. 1 is a perspective view of a theft alarm system according to an embodiment of the disclosure.
Figure 5:
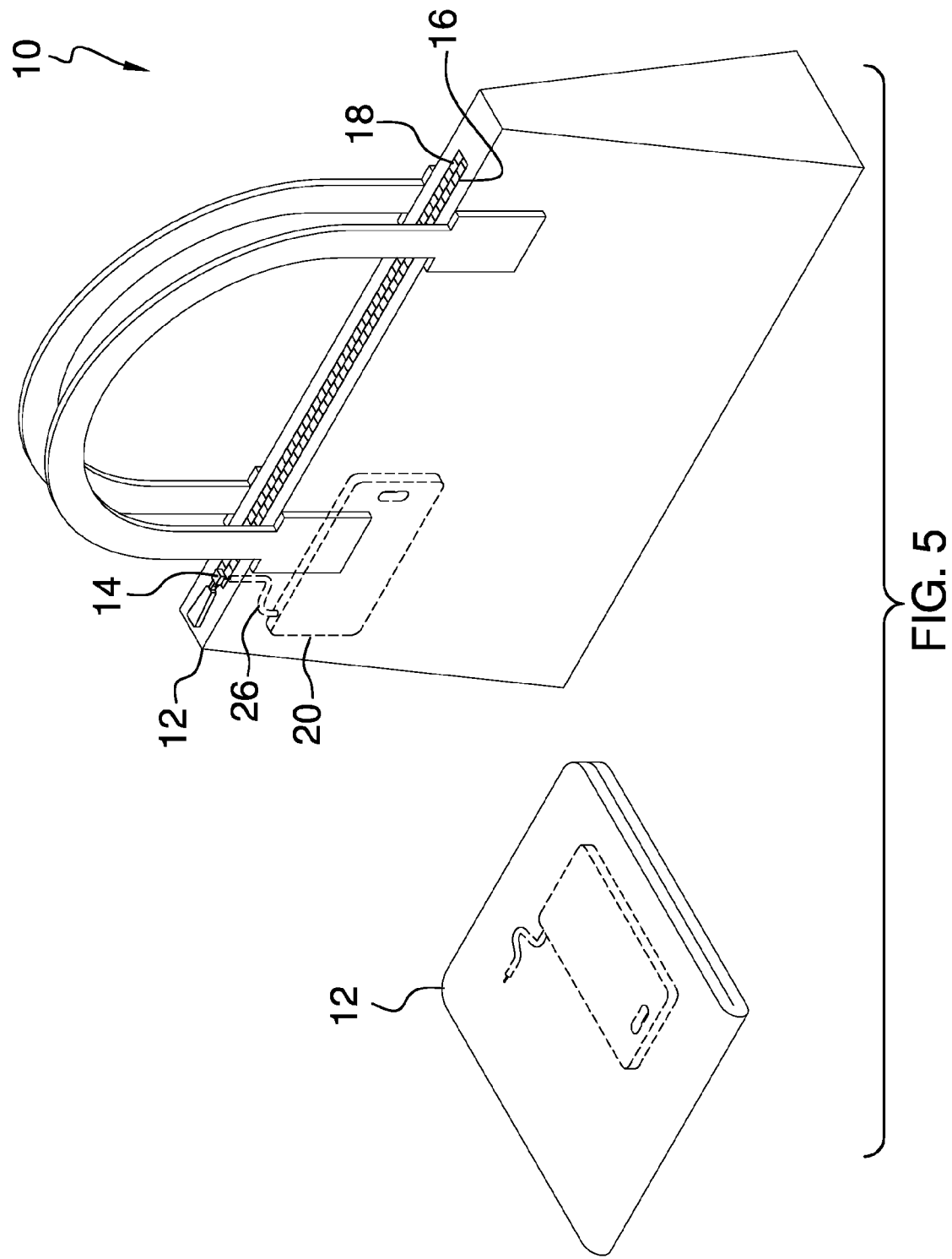
FIG. 5 is a perspective phantom view of a remote unit of an embodiment of the disclosure.
Figure 6:
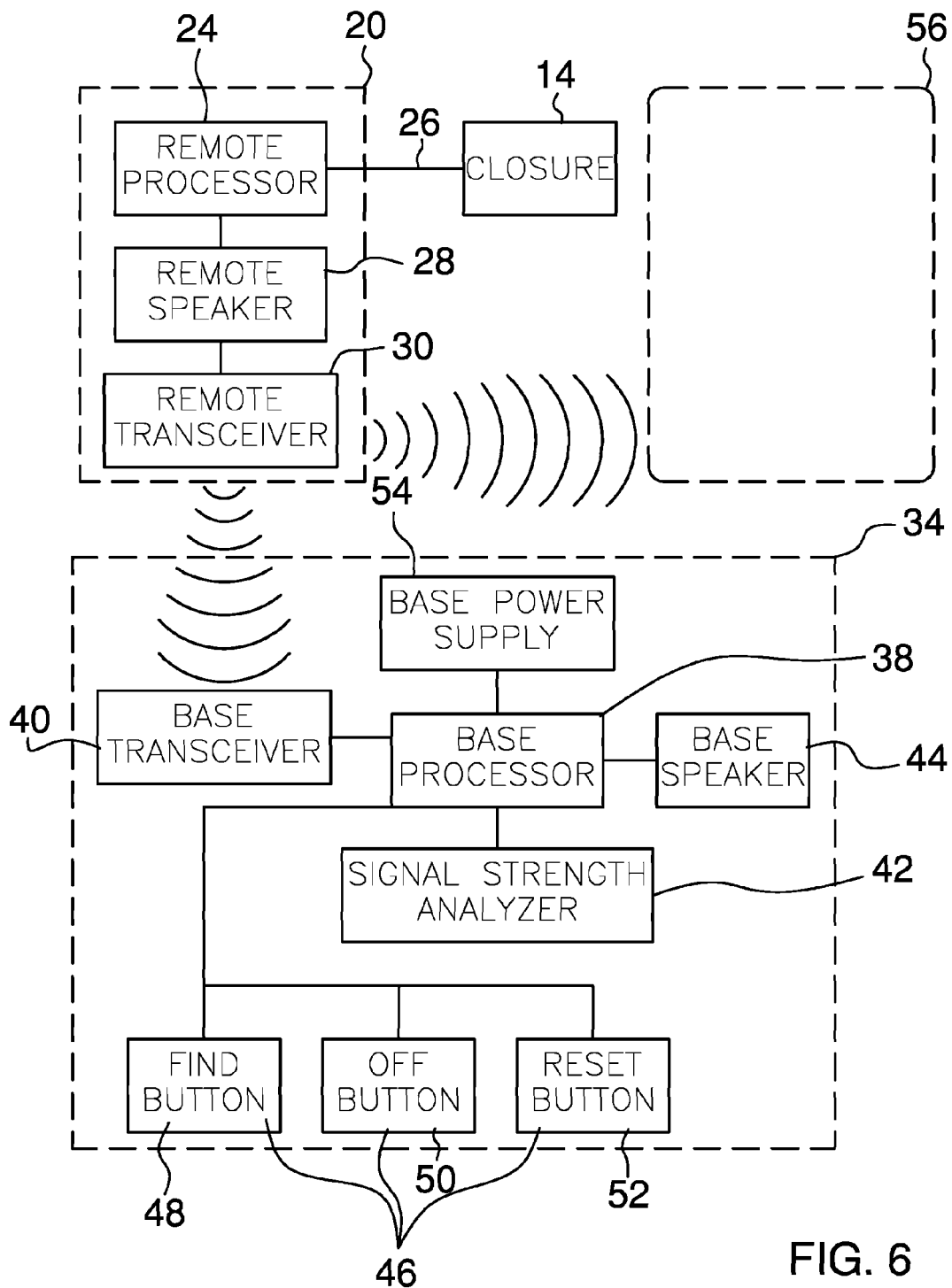
FIG. 6 is a schematic view of an embodiment of the disclosure.

With reference now to the drawings, and in particular to FIGS. 1 through 6 thereof, a new alarm device embodying the principles and concepts of an embodiment of the disclosure and generally designated by the reference numeral 10 will be described.

As best illustrated in FIGS. 1 through 6, the theft alarm system 10 generally comprises a personal article 12 that may be carried. The personal article 12 has a closure 14 that is positionable in an open position to access an interior of the personal article 12. The personal article 12 may comprise a purse or the like and the closure 14 may comprise a zipper. The closure 14 is comprised of an electrically conductive material and the closure 14 includes a first half 16 that removably engages a second half 18. Additionally, the personal article 12 may comprise a wallet.

An alarm unit 20 is coupled to the personal article 12. The alarm unit 20 is in communication with the closure 14. Thus, the alarm unit 20 detects when the closure 14 is manipulated into the open position. The alarm unit 20 generates a first alarm sequence when the closure 14 is positioned in the open position.

The alarm unit 20 comprises a remote housing 22 that is coupled to the personal article 12. The remote housing 22 is integrated into the personal article 12 such that the remote housing 22 may be concealed. The remote housing 22 may comprise a card or the like. A remote processor 24 is positioned within the remote housing 22. The remote processor 24 may comprise an electronic processor or the like. The remote processor 24 is electrically coupled to the closure 14 such that the remote processor 24 detects when the closure 14 is positioned in the open position.

A conductor 26 is electrically coupled to the remote processor 24. The conductor 26 is electrically coupled between the first half 16 of the closure 14 and the second half 18 of the closure 14 to form a closed circuit. The first half 16 is uncoupled from the second half 18 when the closure 14 is manipulated into the open position thereby forming an open circuit. Thus, the remote processor 24 generates the first alarm sequence when the closure 14 is positioned in the open position. A remote speaker 28 is coupled to the remote housing 22 and the remote speaker 28 is electrically coupled to the remote processor 24.

A remote transceiver 30 is positioned within the remote housing 22 and the remote transceiver 30 is electrically coupled to the remote processor 24. The remote transceiver 30 may comprise a radio frequency transceiver or the like. A remote power supply 32 is positioned within the remote housing 22. The remote power supply 32 is electrically coupled to the remote processor 24. The remote power supply 32 comprises at least one battery.

A base unit 34 is provided and the base unit 34 may be carried. The base unit 34 is in communication with the alarm unit 20. The base unit 34 selectively emits an audible alarm when the alarm unit 20 generates the first alarm sequence. Thus, the base unit 34 communicates that the personal article 12 has been stolen. The base unit 34 selectively actuates the alarm unit 20 to emit an audible alarm thereby facilitating the personal article 12 to be located.

The base unit 34 comprises a base housing 36 that may be coupled to a key chain or the like. A base processor 38 is positioned within the base housing 36 and a base transceiver 40 is positioned within the base housing 36. The base transceiver 40 is electrically coupled to the base processor 38 and the base transceiver 40 is in electrical communication with the remote transceiver 30. The base transceiver 40 may comprise a radio frequency transceiver or the like.

A signal strength analyzer 42 is positioned within the base housing 36 and the signal strength analyzer 42 is electrically coupled to the base processor 38. The signal strength analyzer 42 determines a distance between the remote transceiver 30 and the base transceiver 40. The base processor 38 generates a second alarm sequence when the signal strength analyzer 42 detects the personal article 12 has been moved beyond a trigger distance from the base unit 34. The trigger distance may range between approximately nine meters and twelve meters.

A base speaker 44 is coupled to the base housing 36. The base speaker 44 is electrically coupled to the base processor 38 such that the base speaker 44 emits an audible alarm when the base processor 38 generates the second alarm sequence. Thus, the base speaker 44 communicates that the personal article 12 has been stolen. The base speaker 44 emits the audible alarm when the remote processor 24 generates the first alarm sequence. Thus, the base speaker 44 communicates that the personal article 12 has been opened.

A plurality of buttons 46 is movably coupled to the base housing 36 and each of the buttons 46 may be manipulated. Each of the buttons 46 is electrically coupled to the base processor 38 and each of the buttons 46 controls operational parameters of the base processor 38. The plurality of buttons 46 includes a find button 48. The remote speaker 28 emits the audible alarm when the find button 48 is manipulated. Thus, the remote speaker 28 facilitates the personal article 12 to be located when the personal article 12 is misplaced.

The plurality of buttons 46 may additionally include an off button 50 and a reset button 52. The off button 50 turns the base processor 38 off and the off button 50 turns the remote processor 24 off when the off button 50 is manipulated. The reset button 52 terminates the first alarm sequence and the second alarm sequence when the reset button 52 is manipulated. A base power supply 54 is positioned within the base housing 36. The base power supply 54 is electrically coupled to the base processor 38. The base power supply 54 comprises at least one battery.

An electronic device 56 is provided. The electronic device 56 may be carried and the electronic device 56 is in wireless communication with the alarm unit 20. The electronic device 56 may comprise a smart phone or other electronic device 56 utilizing wireless communication. The electronic device 56 may be synced with the remote transceiver 30 using Bluetooth technology or other WPAN signal.

The electronic device 56 emits an audible alarm when the alarm unit 20 generates the first alarm sequence and the second alarm. Thus, the electronic device 56 communicates that the personal article 12 has been stolen and when the personal article 12 is opened. The electronic device 56 selectively actuates the base unit 34 to emit the audible alarm thereby facilitating the personal article 12 to be located. The electronic device 56 may contain an app or other program facilitating the electronic device 56 to control the base unit 34.

In use, the base speaker 44 emits the audible alarm when the closure 14 is positioned in the open position. The off button 50 is manipulated on the base unit 34 when the personal article's owner wishes to open the closure. The base speaker 44 emits the audible alarm when the personal article 12 is moved beyond the trigger distance from the base unit 34. The find button 48 is manipulated when the personal article becomes misplaced. The remote speaker 28 emits the audible alarm thereby facilitating the personal article 12 to be located. The reset button 52 is manipulated at any time to terminate the first alarm sequence, the second alarm sequence and the audible alarm corresponding to the find button 48.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A theft alarm system comprising:
  a personal article being configured to be carried, said personal article having a closure being positionable in an open position to access an interior of said personal article;
  an alarm unit being coupled to said personal article, said alarm unit being in communication with said closure such that said alarm unit detects when said closure is manipulated into said open position, said alarm unit generating a first alarm sequence when said closure is positioned in said open position, wherein said alarm unit comprises a remote housing being coupled to said personal article, said remote housing being integrated into said personal article wherein said remote housing is configured to be concealed;
  a remote processor being positioned within said remote housing, said remote processor being electrically coupled to said closure such that said remote processor detects when said closure is positioned in said open position, said remote processor generating said first alarm sequence when said closure is positioned in said open position;
  a base unit being configured to be carried, said base unit being in communication with said alarm unit, said base unit selectively emitting an audible alarm when said alarm unit generates said first alarm sequence wherein said base unit is configured to communicate that said personal article has been opened, said base unit selectively actuating said alarm unit to emit an audible alarm from said alarm unit thereby facilitating said personal article to be located, wherein base unit comprises
    a base housing being configured to be coupled to a key chain,
    a base processor being positioned within said base housing, and
    a base transceiver being positioned within said base housing, said base transceiver being electrically coupled to said base processor, said base transceiver being in electrical communication with a remote transceiver;
  an electronic device being configured to be carried, said electronic device being in wireless communication with said alarm unit, said electronic device emitting an audible alarm when said alarm unit generates said alarm sequence wherein said electronic device is configured to communicate that said personal article has been opened, said electronic device selectively actuating said alarm unit to emit said audible alarm from said alarm unit thereby facilitating said personal article to be located;

said remote transceiver being in electrical communication with said base transceiver;

a signal strength analyzer being positioned within said base housing, said signal strength analyzer being electrically coupled to said base processor such that said signal strength analyzer determines a distance between said remote transceiver and said base transceiver, said base processor generating a second alarm sequence when said signal strength analyzer detects said personal article has been moved beyond a trigger distance from said base unit;

said remote processor generating said first alarm sequence; and a base speaker being coupled to said base housing, said base speaker being electrically coupled to said base processor such that said base speaker emits an audible alarm when said base processor generates said second alarm sequence wherein said base speaker is configured to communicate that said personal article has been stolen, said base speaker emitting said audible alarm when said remote processor generates said first alarm sequence wherein said base speaker is configured to communicate that said personal article has been opened.

2. The system according to claim 1, further comprising:
a remote speaker being coupled to said remote housing, said remote speaker being electrically coupled to said remote processor; and said remote transceiver being positioned within said remote housing, said remote transceiver being electrically coupled to said remote processor.

3. The system according to claim 1, wherein a remote power supply being positioned within said remote housing, said remote power supply being electrically coupled to said remote processor, said remote power supply comprising at least one battery.

4. The system according to claim 1 further comprising a plurality of buttons being movably coupled to said base housing wherein each of said buttons is configured to be manipulated, each of said buttons being electrically coupled to said base processor such that each of said buttons controls operational parameters of said base processor.

5. The system according to claim 4, further comprising:
a remote speaker emitting an audile alarm; and
said plurality of buttons including a find button, said remote speaker emitting said audible alarm when said find button is manipulated such that said remote speaker facilitates said personal article to be located when said personal article is misplaced.

6. The system according to claim 1, further comprising a base power supply being positioned within said base housing, said base power supply being electrically coupled to said base processor, said base power supply comprising at least one battery.

7. A theft alarm system comprising:
a personal article being configured to be carried, said personal article having a closure being positionable in an open position to access an interior of said personal article;

an alarm unit being coupled to said personal article, said alarm unit being in communication with said closure such that said alarm unit detects when said closure is manipulated into said open position, said alarm unit generating a first alarm sequence when said closure is positioned in said open position, said alarm unit comprising:
a remote housing being coupled to said personal article, said remote housing being integrated into said personal article wherein said remote housing is configured to be concealed,
a remote processor being positioned within said remote housing, said remote processor being electrically coupled to said closure such that said remote processor detects when said closure is positioned in said open position, said remote processor generating said first alarm sequence when said closure is positioned in said open position,
a remote speaker being coupled to said remote housing, said remote speaker being electrically coupled to said remote processor,
a remote transceiver being positioned within said remote housing, said remote transceiver being electrically coupled to said remote processor, and
a remote power supply being positioned within said remote housing, said remote power supply being electrically coupled to said remote processor, said remote power supply comprising at least one battery;

a base unit being configured to be carried, said base unit being in communication with said alarm unit, said base unit selectively emitting an audible alarm when said alarm unit generates said first alarm sequence wherein said base unit is configured to communicate that said personal article has been opened, said base unit selectively actuating said alarm unit to emit an audible alarm from said alarm unit thereby facilitating said personal article to be located, said base unit comprising:
a base housing being configured to be coupled to a key chain,
a base processor being positioned within said base housing,
a base transceiver being positioned within said base housing, said base transceiver being electrically coupled to said base processor, said base transceiver being in electrical communication with said remote transceiver,
a signal strength analyzer being positioned within said base housing, said signal strength analyzer being electrically coupled to said base processor such that said signal strength analyzer determines a distance between said remote transceiver and said base transceiver, said base processor generating a second alarm sequence when said signal strength analyzer detects said personal article has been moved beyond a trigger distance from said base unit,
a base speaker being coupled to said base housing, said base speaker being electrically coupled to said base processor such that said base speaker emits an audible alarm when said base processor generates said second alarm sequence wherein said base speaker is configured to communicate that said personal article has been stolen, said base speaker emitting said audible alarm when said remote processor generates said first alarm sequence wherein said base speaker is configured to communicate that said personal article has been opened,
a plurality of buttons being movably coupled to said base housing wherein each of said buttons is configured to be manipulated, each of said buttons being electrically coupled to said base processor such that each of said buttons controls operational parameters of said base processor, said plurality of buttons including a find button, said remote speaker emitting said audible alarm when said find button is manipulated such that said remote speaker facilitates said personal article to be located when said personal article is misplaced, and a base power supply being positioned within said base housing, said base power supply being electrically coupled to said base processor, said base power supply comprising at least one battery; and an electronic device being configured to be carried, said electronic device being in wireless communication with said alarm unit, said electronic device emitting an audible alarm when said alarm unit generates said alarm sequence wherein said electronic device is configured to communicate that said personal article has been opened, said electronic device selectively actuating said alarm unit to emit said audible alarm from said alarm unit thereby facilitating said personal article to be located.

\* \* \* \* \*